(12) United States Patent
Peterson et al.

(10) Patent No.: US 9,477,560 B2
(45) Date of Patent: Oct. 25, 2016

(54) METHODS OF CREATING A VOTING STOP POINT ON A DISTRIBUTED NETWORK

(75) Inventors: Nathan J. Peterson, Raleigh, NC (US); Rod D. Waltermann, Rougement, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1805 days.

(21) Appl. No.: 11/831,926

(22) Filed: Jul. 31, 2007

(65) Prior Publication Data

US 2009/0037584 A1    Feb. 5, 2009

(51) Int. Cl.
G06F 15/173     (2006.01)
G06F 11/18      (2006.01)
G06F 11/14      (2006.01)

(52) U.S. Cl.
CPC ......... *G06F 11/182* (2013.01); *G06F 11/1425* (2013.01)

(58) Field of Classification Search
USPC ............................................ 709/226; 705/12
See application file for complete search history.

(56) References Cited

U.S. PATENT DOCUMENTS

| | | | |
|---|---|---|---|
| 5,701,480 A * | 12/1997 | Raz ............................... | 718/101 |
| 5,909,540 A * | 6/1999 | Carter et al. ................... | 714/4.4 |
| 6,931,431 B2 * | 8/2005 | Cachin et al. ................ | 709/205 |
| 7,377,431 B2 * | 5/2008 | Urken ........................... | 235/386 |
| 7,680,757 B2 * | 3/2010 | Wolff et al. ..................... | 706/59 |
| 2001/0037234 A1 * | 11/2001 | Parmasad et al. .............. | 705/12 |
| 2002/0103695 A1 * | 8/2002 | Urken et al. .................... | 705/12 |
| 2003/0009540 A1 * | 1/2003 | Benfield et al. .............. | 709/220 |
| 2003/0158775 A1 * | 8/2003 | Chaum ......................... | 705/12 |
| 2004/0024635 A1 * | 2/2004 | McClure et al. .............. | 705/12 |
| 2005/0163061 A1 * | 7/2005 | Piercey et al. ................ | 370/255 |
| 2005/0198106 A1 * | 9/2005 | Lamport ....................... | 709/201 |
| 2006/0253560 A1 * | 11/2006 | Aaltonen ...................... | 709/223 |
| 2007/0023515 A1 * | 2/2007 | Urken ........................... | 235/386 |
| 2007/0245033 A1 * | 10/2007 | Gavrilescu et al. .......... | 709/230 |
| 2007/0276723 A1 * | 11/2007 | Samid ............................ | 705/12 |
| 2008/0077635 A1 * | 3/2008 | Sporny et al. ................ | 707/204 |
| 2008/0267147 A1 * | 10/2008 | Niranjan et al. .............. | 370/338 |

* cited by examiner

*Primary Examiner* — Hua Fan
(74) *Attorney, Agent, or Firm* — Ference & Associates LLC

(57) ABSTRACT

A highly efficient and effective method for deciding, in the context of a distributed computer network, how many computers will participate in an initial vote if multiple computers are started in the same general time frame.

15 Claims, 3 Drawing Sheets

METHODS OF CREATING A VOTING STOP POINT ON A DISTRIBUTED NETWORK

FIELD OF THE INVENTION

The present invention relates to distributed computer networks and to methods and arrangements for voting on resource ownership in such contexts.

BACKGROUND OF THE INVENTION

Today, in traditional cluster computing methods (i.e., in distributed computer networks as well known in the sense of that term), resources are defined statically or at system-build time. This causes problems in cases where the servers are casually connected or unreliable.

Typically, in a distributed network, tasks or resources need to be apportioned out among participating machines. To the extent a machine is operational within a network, then, it normally will send out a "ballot" during a "voting" process as a constructive step to "request" such an apportionment. Generally, a ballot contains a manifest of the resources being voted on and the vote results from each machine. All the ballots added up will decide which machine will run which resource.

In practice, when votes are undertaken on resource ownership, problems can easily present themselves. For instance, if a relatively complex voting method is used when machines are started, a problem arises in determining which machine(s) participate(s) in the initial voting, and also in finding agreement on a winner without the need for a secondary vote.

A need has been recognized in connection with overcoming such problems and deficiencies.

SUMMARY OF THE INVENTION

In accordance with a preferred embodiment of the present invention, there is broadly contemplated a highly efficient and effective method for deciding, in the context of a distributed computer network, how many computers will participate in an initial vote if multiple computers are started in the same general time frame.

In summary, one aspect of the invention provides method of apportioning resources in a distributed network, the method comprising the steps of: incorporating a machine in network; sending a ballot from the machine; and precluding another machine associated with the network from sending a ballot beyond a temporal threshold.

Another aspect of the invention provides a system of apportioning resources in a distributed network, the system comprising: an arrangement for sending a ballot from a machine in network; and an arrangement for precluding another machine associated with the network from sending a ballot beyond a temporal threshold.

Furthermore, an additional aspect of the invention provides a program storage device readable by machine, tangibly embodying a program of instructions executable by the machine to perform a method of apportioning resources in a distributed network, the method comprising the steps of: incorporating a machine in network; sending a ballot from the machine; and precluding another machine associated with the network from sending a ballot beyond a temporal threshold.

DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
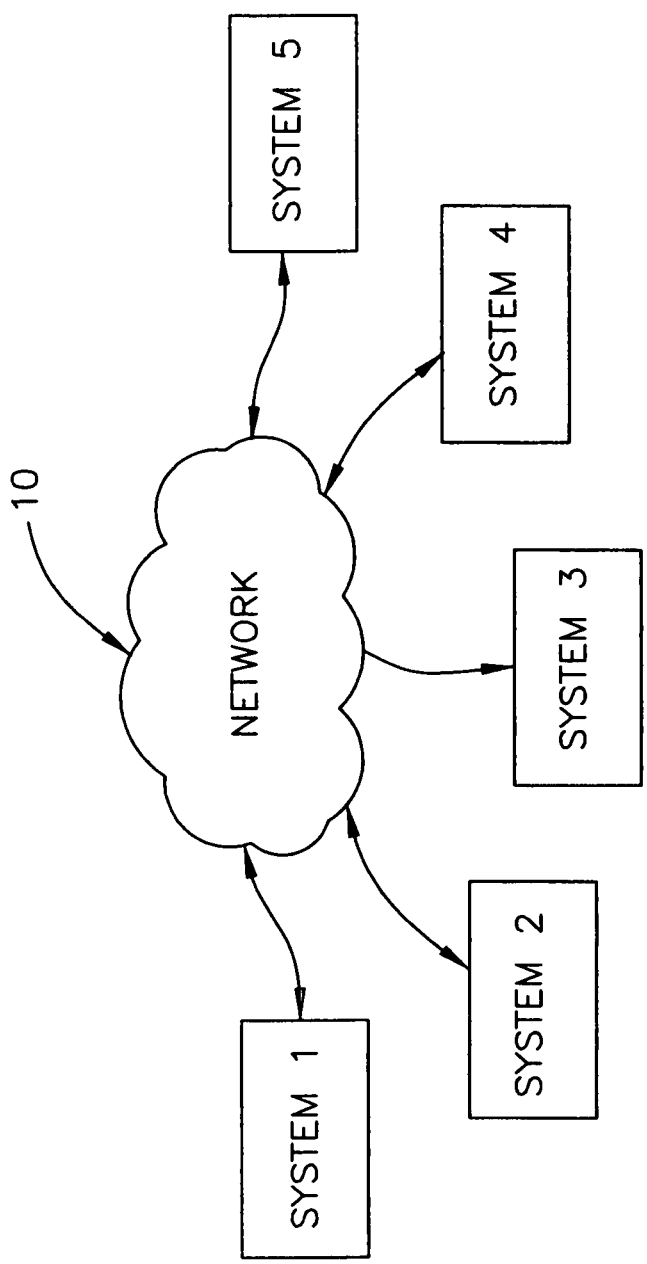
FIG. 1 schematically illustrates a distributed computer network.
Figure 2:
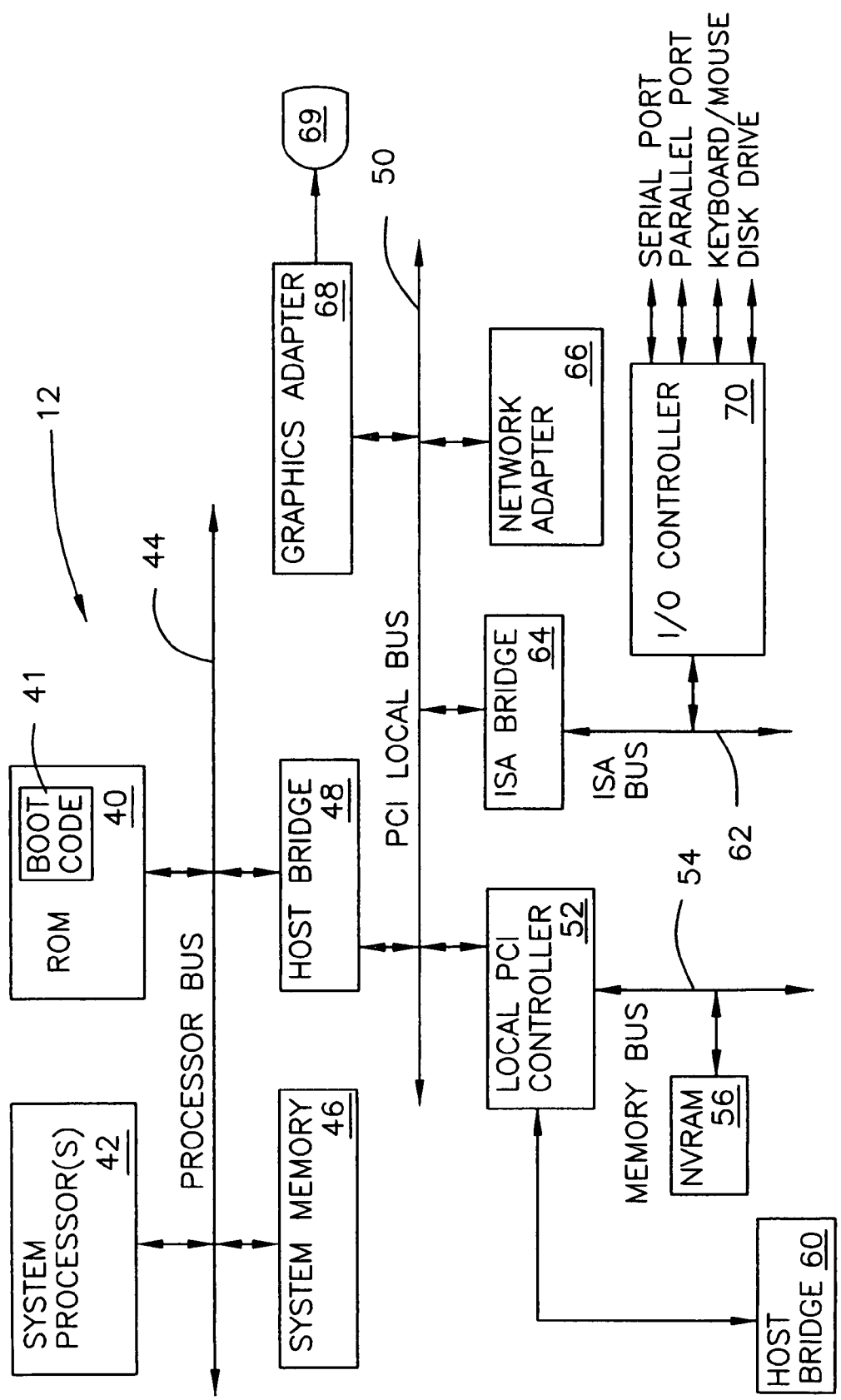
FIG. 2 schematically illustrates a computer system and components thereof.
Figure 3:
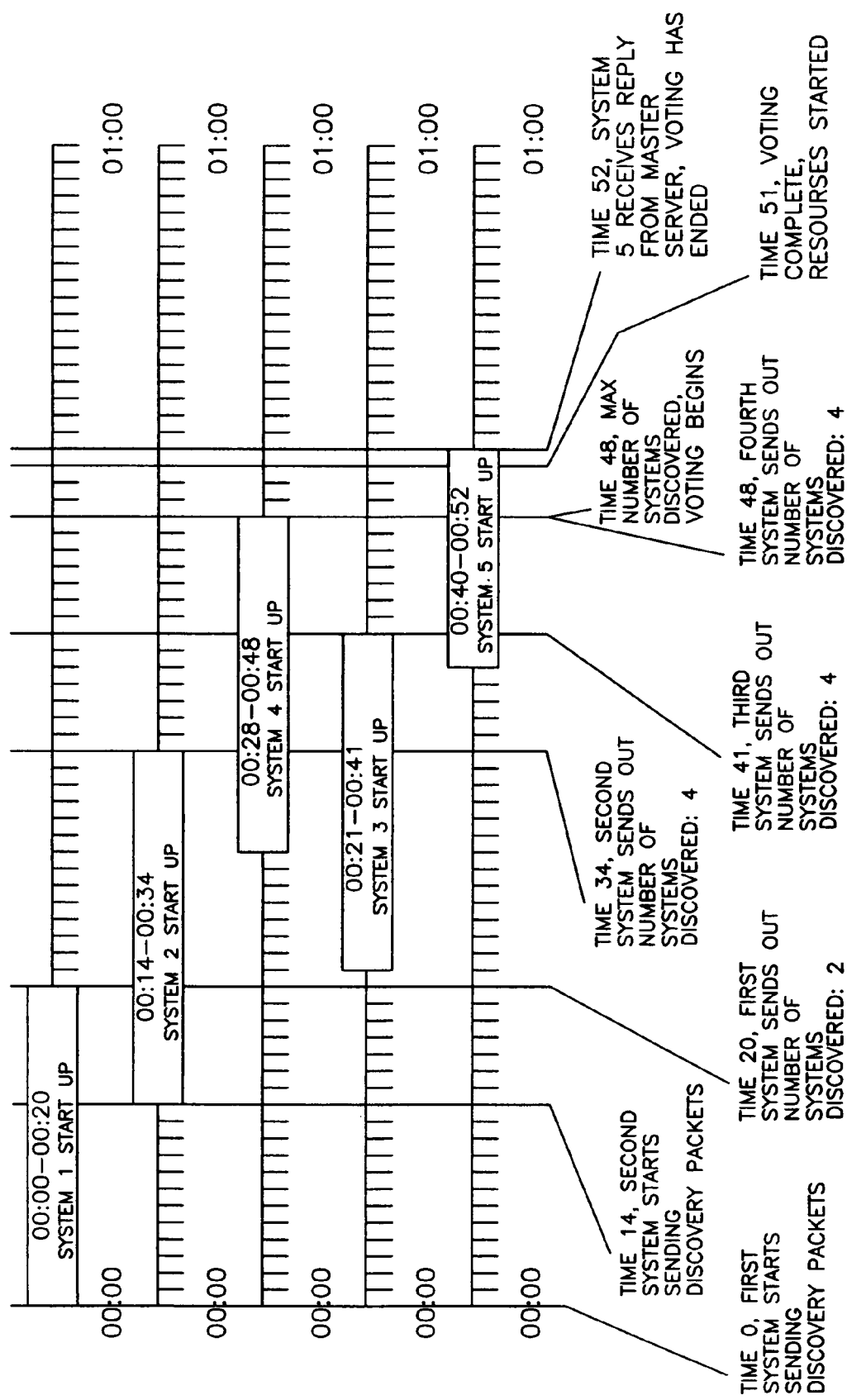
FIG. 3 provides a time-based diagram of machine startup and voting in a distributed network (such as that shown in FIG. 1).

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

FIG. 1 illustrates a distributed computer network 10. As shown, several computer systems (here numbered consecutively 1 through 5) may be connected into the network 10, and thus with each other. The basic connections of systems 1 through 5 with each other via network 10 are embodied by essentially any suitable arrangement as known in the distributed computer arts. However, as discussed further below (particularly with reference to FIG. 3), the network 10 is also preferably configured to effect a voting method that distinguishes significantly from conventional methods. Of course, more than five systems may be connected via a network 10; the quantity of five is merely chosen here as a convenient example.

The systems 1 through 5 depicted in FIG. 1 can each be constructed in essentially any suitable manner. FIG. 2, for its part, illustrates a computer system 12 with a structure that could be replicated in any or all of systems 1 through 5 (FIG. 1), merely by way of an illustrative and non-restrictive example.

Accordingly, FIG. 2 depicts a block diagram of an illustrative embodiment of a computer system 12. As shown, computer system 12 includes at least one system processor 42, which is coupled to a Read-Only Memory (ROM) 40 and a system memory 46 by a processor bus 44. System processor 42 is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a local area network (LAN) (such as that indicated at 10 in FIG. 1), and graphics adapter 68, which interfaces computer system 12 to display (or monitor) 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and a disk drive. In addition, I/O controller 70 supports external communication by computer system 12 via serial and parallel ports. As known, docking connections enable the computer system 12 to be docked at a suitable docking station, which itself may provide expanded capabilities such as a large-screen monitor, a keyboard, a mouse and a disk drive.

It should be further understood that while FIG. 2 conveys specific hardware components that can be employed in accordance with embodiments of the present invention, the concepts discussed and contemplated herein are of course applicable to a very wide variety of computer systems and constituent conventional components.

FIG. 3 provides a time-based diagram of a process of machine startup and voting in a distributed network (such as that shown in FIG. 1), in accordance with a presently preferred embodiment of the present invention. It is to be understood that specifics of the process depicted in FIG. 3 are provided by way of an illustrative and non-restrictive example, and in no way are intended to limit the very wide range of possible process elements that can be encompassed within the scope of the embodiments of the present invention.

Expressed generally, each machine that starts up preferably sends out an initial "Announcement" packet and then repeats that packet each second for a predetermined time (e.g., 20 seconds). This 20 seconds may be referred to as the "Discovery Phase" for each machine in question.

At the end of the Discovery Phase, each machine will next preferably send out a "Vote Request" packet that expresses the number of machines discovered by the individual machine in question. Further, the Vote Request packet will include each machine's request to vote.

If the number of machines discovered is equal to the number of Vote Request packets received, then each machine participating sends out a Ballot containing its vote results. This also constructively applies a "cut off" that precludes any more machines from sending out Ballots.

A working example is now provided, with continued reference to FIG. 3, that illustrates the above-outlined method as applied to a hypothetical scenario with five systems (as in FIG. 1). (Again, it should be understood that more than five systems may of course be connected via a network 10; the quantity of five is merely chosen here as a convenient example.)

The time scale depicted in FIG. 3 runs from "time zero", or "0:00", at the far left of the diagram to an elapsed time of one minute, or "1:00", at the far right of the diagram. The machines in the network are identified as "Systems" 1 through 5 as in FIG. 1. The expressions below (and in FIG. 3) of "Time x", where x is an integer number, convey the number of seconds that have elapsed since "time zero".

The working example is presented herebelow (and with continued reference to FIG. 3) by way of designating individual timepoints (themselves expressly so labeled and indicated in FIG. 3) and, for each such designated timepoint, summarizing actions undertaken by one or more of the Systems 1-5 or presenting other general comments of relevance. Further, relevant parameters relating to each system at the designated timepoints are conveyed (e.g., the number of requests to vote received, the number of machines discovered by the system in question, etc.)

Time 0
    System 1:
        Starts
        Sends out an initial Discovery Packet, and repeats during the Discovery Phase
        Machines System 1 has discovered during Discovery Phase: 1
        Requests to Vote received: 0

Time 14
    System 1:
        Receives Discovery Packet from System 2.
        Machines System 1 has discovered during Discovery Phase: 2
        Requests to Vote received: 0
    System 2:
        Starts
        Sends out an initial Discovery Packet, and repeats during the Discovery Phase
        Receives a Discovery Packet from System 1
        Machines System 2 has discovered during Discovery Phase: 2
        Requests to Vote received: 0

Time 20
    System 1:
        Sends out a Request to Vote after Discovery Phase complete.
            Packet contains:
                Machines System 1 has discovered during Discovery Phase: 2
        At this point System 1 has less Requests to Vote than Max number of Systems, so System 1 waits.
        Requests to Vote received: 1

System 2:
  Receives Request to Vote from System 1.
  Request to Vote Packet is stored.
  System 1 discovered 2 machines, which is not greater than maximum machines.
  Still in Discovery Phase (The Discovery Packet now carries the Request to Vote (RtoV) packet from System 1, so that any new machines will receive the RtoV from System 1).
  Machines System 2 has discovered during Discovery Phase: 2
  Maximum machines discovered by any System during discovery: 2
  Requests to Vote received: 1

Time 21
  System 1:
    Waiting until number of vote requests received=highest number of machines discovery by a single machine
    Machines System 1 has discovered during Discovery Phase: 2
    Maximum machines discovered by any System during discovery: 2
    Requests to Vote received: 1
  System 2:
    Receives Discovery Packet from System 3
    Machines System 2 has discovered during Discovery Phase: 3
    Maximum machines discovered by any System during discovery: 2
    Requests to Vote received: 1
  System 3:
    Starts
    Sends out an initial Discovery Packet, and repeats during the Discovery Phase
    Receives Discovery Packet from System 2 (System 3 gets the RtoV data for System 1 from System 2)
    Machines System 3 has discovered during Discovery Phase: 2
    Requests to Vote received: 1

Time 28
  System 1:
    Waiting until number of vote requests received=highest number of machines discovery by a single machine
    Machines System 1 has discovered during Discovery Phase: 2
    Requests to Vote received: 1
  System 2:
    Receives Discovery Packet from System 4
    Machines System 2 has discovered during Discovery Phase: 4
    Requests to Vote received: 1
  System 3:
    Receives Discovery Packet from System 4
    Machines System 3 has discovered during Discovery Phase: 3
    Requests to Vote received: 1
  System 4:
    Starts
    Receives Discovery Packet from System 2 (System 4 gets the RtoV data for System 1 from System 2)
    Receives Discovery Packet from System 3 (System 4 gets the RtoV data for System 1 from System 3, data matches what System 2 sent, no new RtoV added.)
    Machines System 4 has discovered during Discovery Phase: 3
    Requests to Vote received: 1

Time 34
  System 1:
    Receives Request to Vote from System 2.
    System 2 discovered 4 machines; System 1 is set to wait for 4 Request to Votes before voting.
    Machines System 1 has discovered during Discovery Phase: 2
    Requests to Vote received: 2
  System 2:
    Sends out a Request to Vote after Discovery Phase complete.
      Packet contains:
        Machines discovered: 4
    Machines System 2 has discovered during Discovery Phase: 4
    Requests to Vote received: 2
  System 3:
    Receives Request to Vote from System 2.
    System 2 discovered 4 machines; System 3 is set to wait for 4 Request to Votes before voting.
    Machines System 3 has discovered during Discovery Phase: 3
    Requests to Vote received: 2
  System 4:
    Receives Request to Vote from System 2.
    System 2 discovered 4 machines; System 4 is set to wait for 4 Request to Votes before voting.
    Machines System 4 has discovered during Discovery Phase: 3
    Requests to Vote received: 2

Time 40
  System 1:
    Waiting until number of vote requests received=highest number of machines discovery by a single machine
    Machines System 1 has discovered: 2
    Requests to Vote received: 2
  System 2:
    Receives Discovery Packet from System 5
    Machines System 2 has discovered during Discovery Phase: 4
    Requests to Vote received: 2
  System 3:
    Receives Discovery Packet from System 5
    Machines System 3 has discovered during Discovery Phase: 4
    Requests to Vote received: 2
  System 4:
    Starts
    Receives Discovery Packet from System 5
    Machines System 4 has discovered during Discovery Phase: 4
    Requests to Vote received: 2
  System 5:
    Starts
    Receives Discovery Packet from System 3
    Receives Discovery Packet from System 4
    Machines System 5 has discovered during Discovery Phase: 3
    Requests to Vote received: 2

Time 41
  System 1:
    Receives Request to Vote from System 3.
    Machines System 1 has discovered during Discovery Phase: 2
    Requests to Vote received: 3
  System 2:
    Receives Request to Vote from System 3.
    Machines System 2 has discovered during Discovery Phase: 4
    Requests to Vote received: 3
  System 3:
    Sends out a Request to Vote after Discovery Phase complete.
      Packet contains:
        Machines discovered: 4
    Machines System 3 has discovered during Discovery Phase: 4
    Requests to Vote received: 3
  System 4:
    Receives Request to Vote from System 3.
    Machines System 4 has discovered during Discovery Phase: 4
    Requests to Vote received: 3
  System 5:
    Machines System 5 has discovered during Discovery Phase: 3
    Requests to Vote received: 3
Time 48
  System 1:
    Receives Request to Vote from System 4.
    Machines System 1 has discovered during Discovery Phase: 2
    Requests to Vote received: 4
  System 2:
    Receives Request to Vote from System 4.
    Machines System 2 has discovered during Discovery Phase: 4
    Requests to Vote received: 4
  System 3:
    Receives Request to Vote from System 4.
    Machines System 3 has discovered during Discovery Phase: 4
    Requests to Vote received: 4
  System 4:
    Sends out a Request to Vote after Discovery Phase complete.
      Packet contains:
        Machines discovered: 4
    Machines System 4 has discovered during Discovery Phase: 4
    Requests to Vote received: 4
  System 5:
    Receives Request to Vote from System 4.
    Machines System 5 has discovered during Discovery Phase: 3
    Requests to Vote received: 4
  In summary, the maximum number of machine discovered by any single System was 4. At this point, 4 Requests to Vote have been transmitted. This condition will cause all the machines that, at this point, have sent out a Request to Vote to start the actual vote process. System 5 has not reached the end of it's 20-second Discovery Phase and will not actually get a vote during the vote process. The vote is processed by Systems 1-4 all simultaneously sending out their ballots. A ballot contains a manifest of the resources being voted on and the vote results from each machine. All the ballots added up will decide which machine will run which resource.

Time 51 (This time, of course, may vary)
  Voting has completed. Resources are starting.
Time 52
  System 5 receives a list of which machines are running which resource, and Discovery Phase stops (possibly before the 20 seconds of Discovery Phase are up) due to vote being completed.

Generally speaking, and as can well be appreciated by the above working example, methods as broadly contemplated herein, in accordance with at least one presently preferred embodiment of the present invention, preferably ensure that even if systems are started up in a random or non-orderly fashion, a "cut off" point will be applied that ensures that server resources are available in a timely manner. This will thus obviate what otherwise would be a conventional scenario in which voting would be delayed unreasonably solely for the sake of including as many machines as possible.

In further recapitulation, it should be understood and appreciated that a method in accordance with at least one embodiment of the present invention can be employed in the context of essentially any number of machines or systems connected in a network (such as the network 10 indicated in FIG. 1). Thus, while 5 machines or systems have been discussed in working examples herein (see FIGS. 1 and 3), the methods broadly encompassed by the present invention can apply to a network that connects greater than 5 machines (such as 6, 7, 8 or more machines) or fewer than 5 machines (such as 2, 3 or 4 machines).

Conceivably, the methods broadly encompassed by the present invention could even apply to a network that "connects" solely one machine. In such an instance, the sole machine would "discover" itself and then submit a Ballot allowing it (with no "competition") to take on all network resources once the Discovery Phase is complete.

In another scenario, two or more machines could be provided with a network, and then if only one machine submits a Request to Vote before the cut-off point discussed herein, solely that machine will send a Ballot and thus procure all system resources. Again, as touched on further above, a major benefit provided here is that resource procurement need not be delayed in the face of slow or delayed start-ups of other machines.

Mainly, the "one machine" scenarios are presented here to emphasize that a versatile method, as characterized in accordance with at least one embodiment of the present invention, will be able to flexibly accommodate (a) essentially any number of machines that are present in a network to begin with, including the scenario of a one-machine "network" and (b) in a network including two or more machines, essentially any number of machines that have submitted Requests to Vote before the cut-off point discussed hereabove, down to and including the case of only one such machine.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
conducting a voting process to decide which machine in a distributed network will run which resource, said voting process comprising:
starting one or more machines in the distributed network; and
conducting a discovery phase of predetermined duration following the starting of the one or more machines in the distributed network, the discovery phase comprising:
sending announcement packets;
determining a number of machines discovered during the discovery phase; and
sending a vote request packet following the discovery phase, the vote request packet comprising the number of machines discovered and a request to vote;
in response to a number of machines discovered in said discovery phase being equal to a number of vote request packets received, sending a ballot from the one or more machines; and
thereafter precluding another machine associated with the distributed network from sending a ballot.

2. The method according to claim 1, wherein said precluding step comprises applying a temporal threshold responsive to a predetermined condition.

3. The method according to claim 1, wherein:
said starting one or more machines comprises starting a first machine in the distributed network and a second machine in the distributed network;
said precluding further comprising precluding the second machine from sending a ballot after the first machine has sent a ballot.

4. The method according to claim 3, wherein said conducting a discovery phase further comprises:
sending an announcement packet from each of the first and second machines; and
discovering an announcement packet from one of the first and second machines at the other one of the first and second machines.

5. The method according to claim 4, further comprising the step of applying a delay period for each of the first and second machines, wherein sending a ballot is precluded during the delay period.

6. The method according to claim 5, further comprising:
sending a request to vote from the first machine;
precluding said sending a request to vote during the delay period.

7. The method according to claim 6, wherein said step of sending a request to vote:
precedes said sending a ballot; and
immediately follows the delay period.

8. The method according to claim 4, further comprising repeatedly sending an announcement packet from each of the first and second machines during the delay period for each of the first and second machines.

9. The method of claim 1, wherein the discovery phase of predetermined duration is 20 seconds.

10. A system comprising:
a processor;
a storage device having computer readable program code stored therewith, the computer readable program code executed by the processor to:
conduct a voting process to decide which machine in a distributed network will run which resource, comprising:
in response to starting one or more machines in the distributed network:
send announcement packets;
determine a number of machines discovered during a discovery phase; and
send a vote request packet following the discovery phase, the vote request packet comprising the number of machines discovered and a request to vote;
send a ballot in response to a number of machines discovered in said discovery phase being equal to a number of vote request packets received; and
thereafter preclude another machine associated with the distributed network from sending a ballot.

11. The system according to claim 10, wherein said computer readable program code executed by the processor to thereafter preclude comprises computer readable program code to apply a temporal threshold responsive to a predetermined condition.

12. The system according to claim 10, further comprising computer readable program code executed by the processor to apply a delay period for each machine in the distributed network, wherein sending a ballot is precluded during the delay period.

13. The system according to claim 12 wherein said computer readable program code executed by the processor to send a request to vote comprises sending the request to vote:
prior to a ballot being sent; and
immediately following the delay period.

14. The system according to claim 12, further comprising computer readable program code executed by the processor to repeatedly send an announcement packet from the system to one or more other machines in the distributed network during the delay period.

15. A program storage device readable by machine, tangibly embodying a program of instructions executable by the machine to perform steps comprising:
conducting a voting process to decide which machine in a distributed network will run which resource, said voting process comprising:
starting one or more machines in the distributed network within a general time frame; and
conducting a discovery phase of predetermined duration, the discovery phase comprising:
sending announcement packets;
determining a number of machines discovered during the discovery phase; and
sending a vote request packet following the discovery phase, the vote request packet comprising the number of machines discovered and a request to vote;
in response to a number of machines discovered in said discovery phase being equal to a number of vote request packets received, sending a ballot from the one or more machines; and
thereafter precluding another machine associated with the distributed network from sending a ballot.

* * * * *